No. 734,978. PATENTED JULY 28, 1903.
T. SIMPSON.
VALVE MECHANISM.
APPLICATION FILED DEC. 23, 1902.
NO MODEL.
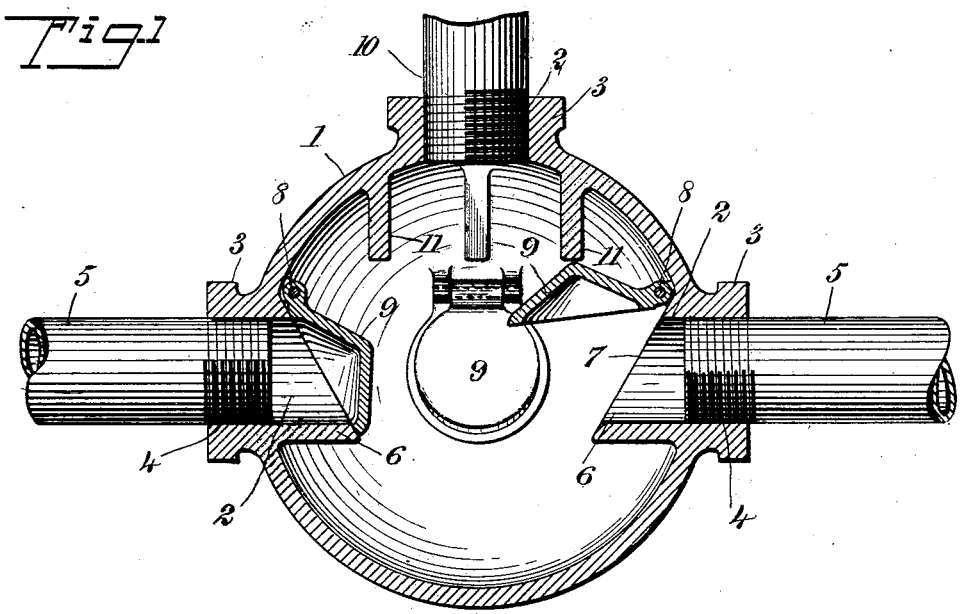
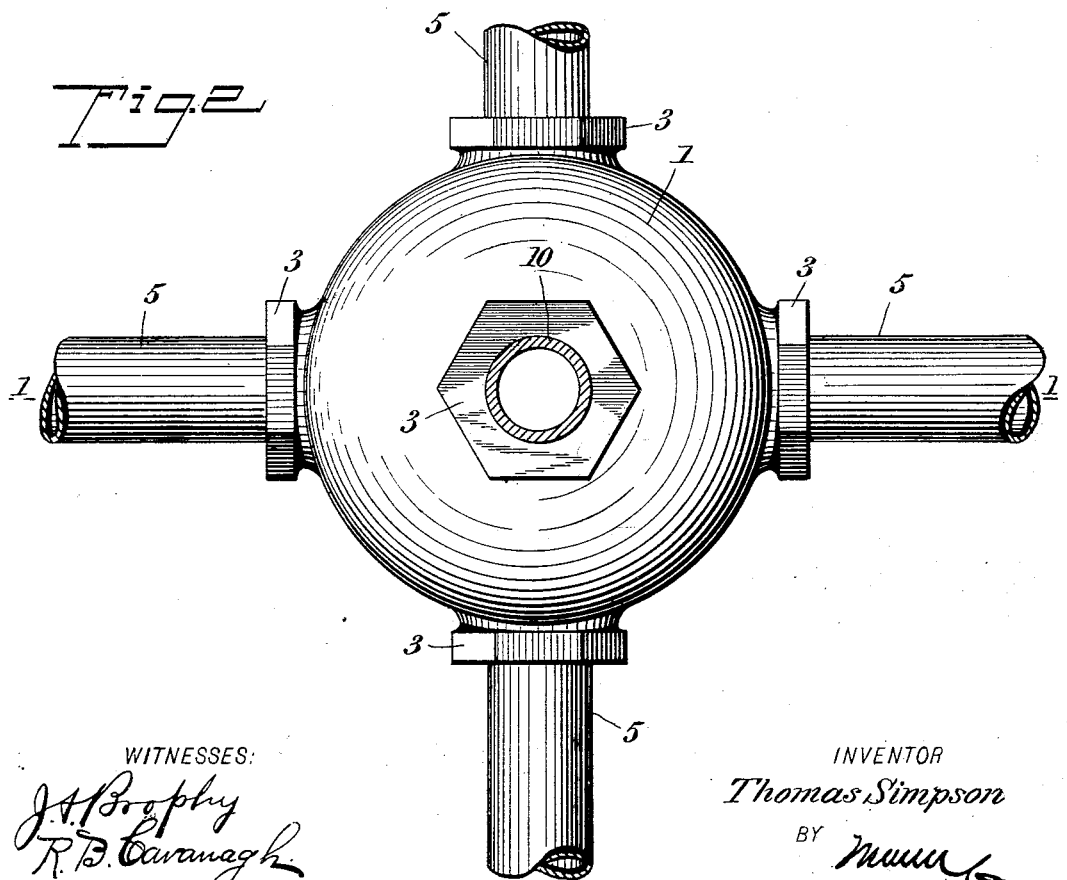
WITNESSES:
J. H. Brophy
R. B. Cavanagh
INVENTOR
Thomas Simpson
BY
ATTORNEYS No. 734,978. Patented July 28, 1903.

UNITED STATES PATENT OFFICE.

THOMAS SIMPSON, OF ABBEVILLE, LOUISIANA.

VALVE MECHANISM.

SPECIFICATION forming part of Letters Patent No. 734,978, dated July 28, 1903.

Application filed December 23, 1902. Serial No. 136,312. (No model.)

*To all whom it may concern:*

Be it known that I, THOMAS SIMPSON, a citizen of the United States, and a resident of Abbeville, in the parish of Vermilion and State of Louisiana, have invented new and useful Improvements in Valve Mechanisms, of which the following is a full, clear, and exact description.

My invention relates to certain novel and useful improvements in the construction of valves, and has particular application to a valve mechanism for connecting a battery of boilers with a main steam-pipe.

In carrying out the present invention I have particularly in view the construction of a valve mechanism which will be exceedingly simple in its construction, durable, and entirely automatic in its operation, and one which will not be constantly requiring the attendance of an operator.

A further object of the present invention is to construct a valve mechanism which will effect a great saving of fuel and will also act as a safeguard against the explosion of the boiler.

With these ends and others of a similar nature in view my invention consists in the peculiar construction, combination, and arrangement of parts, as will be hereinafter described in this specification, illustrated in the drawings, and set forth in the appended claims.

While I have shown and herein described one particular embodiment of my invention, it will of course be understood that I do not limit myself to the precise details of construction shown herein, as there may be modifications and variations in some respects without departing from the spirit of the invention or sacrificing any of the numerous advantages thereof.

Reference is to be had to the accompanying drawings, forming a part of this specification, in which similar characters of reference indicate corresponding parts in both the figures.

Figure 1 is a sectional view taken on the line 1 1 of Fig. 2 of a valve mechanism embodying my improvements, and Fig. 2 is a top plan view showing the steam-outlet and the arrangement of the pipes or steam-ducts leading from a battery of boilers.

In the accompanying drawings, wherein an embodiment of my invention is illustrated, 1 indicates a valve casing or housing, which may be of any preferred shape, but is preferably spherical in conformation, as shown. Leading into the casing or housing are a number of openings or passage-ways 2 2, the walls forming the passage-ways extending beyond the outer spherical surface of the casing, forming the shoulders 3, and such walls are screw-threaded, as at 4, to receive the ends of the pipes 5, which lead from the boiler. It will of course be understood that there may be any number of these pipes 5, and as there is one passage-way into the casing for each pipe the number of passage-ways will correspond to the number of pipes. The ends of the walls of the passage-ways 6, which extend into the interior casing, are preferably beveled or inclined, as shown at 7, and above the passage-way or duct a valve-cap 9 is hinged to the wall of the casing, as at 8. In the present instance this valve-cap is shown as conical in shape and is hinged in such manner that it fits tightly and snugly upon the inclined face of the walls of the passage-way.

Where I have employed four passage-ways and four valves controlling the steam from the boilers these valves are arranged diametrically opposite, so that when one of the valves is open and the steam is passing therethrough the valve directly opposite will be held in its closed condition upon its inclined seat unless the pressure of said closed pipe becomes so great as to overcome the pressure from the opposite steam-duct. The main steam-pipe, which is formed at the upper portion of the valve-casing, as shown at 10, is adapted to permit the escape of the steam from the casing. For the purpose of acting as stops for the valve-caps when they are suddenly forced upward by the pressure in the pipes or ducts I have formed a number of lugs 11 upon the interior of the casing, which lugs extend inwardly, one above each valve-cap, to such an extent that when the cap is forced from its seat it will contact with said lug 11.

Although in the present instance I have shown the passage-way extending some distance into the casing or steam-chamber and provided with a butterfly or flap valve, it will of course be understood that the shape of this portion may be changed to some extent without affecting the invention.

It is to be observed that with a valve and valve-housing such as I have devised any number of boilers, forming what may be termed a "battery" of boilers, may be automatically connected, the number of valves or caps corresponding to the number of boilers in the battery. In large sugar refineries explosion of the boilers frequently occurs, due to the fact that when a connection is made between boilers, as by opening a valve on the steam-pipe, the pressure of one battery exceeds the pressure of the other. This is obviated by my improvement, as the pressure is regulated by the same.

It will furthermore be observed that an excess of steam in the boiler is immediately relieved and is permitted to escape through my improved valve mechanism without the necessity of an attendant being present to regulate the same, and such an advantage is very important, as it obviates to a great extent the possibility of accidents through the explosion of the boilers.

Having thus described my invention, I claim as new and desire to secure by Letters Patent—

1. A valve mechanism of the class described, comprising a casing or chamber, a plurality of passage-ways for the steam leading into said casing at diametrically opposite points, valves for said passage-ways, and a duct for the escape of steam leading from said chamber, substantially as set forth.

2. A valve mechanism of the class described, comprising a casing or chamber, passage-ways from a battery of boilers, leading into said chamber, valves for said passage-ways, adapted to be opened by the pressure of steam in said passage-ways, located within the chamber and means for limiting the upward movement of the valves, and a passage-way for the escape of steam from the chamber, the said passage-way leading from the upper central portion of the chamber, substantially as set forth.

3. A valve mechanism of the class described, comprising a valve casing or chamber, diametrically-arranged passage-ways for the admission of steam into said chamber, the walls of the passage-ways extending some distance into the interior of the chamber, a cap forming a valve, hinged above the mouth of each passage-way within the valve-chamber, said cap being moved from its seat by the pressure of steam in the passage-way, means formed on the interior of the casing for limiting the upward movement of the valve-cap, and a steam-outlet leading from the upper part of said chamber, substantially as set forth.

4. A valve mechanism of the class described, comprising a valve-chamber, a number of diametrically-arranged steam-inlets leading into said chamber or casing, a cap forming a valve, hinged above the mouth of each inlet in the chamber, lugs formed on the interior of the casing for limiting the movement of the valve-cap, and a steam-outlet leading from said casing, substantially as set forth.

5. A valve mechanism of the class described comprising a valve-chamber spherical in form, a series of diametrically-arranged steam-inlets leading into said chamber, the ends of the inlets extending into the chamber being inclined, a valve-cap conical in shape and hinged within the chamber above the mouth of each inlet, and adapted to fit upon the said inclined end of the inlet, lugs on the interior of the chamber at the upper part, one above each valve-cap, for limiting the movement of the same, and a steam-outlet leading from the upper portion of the chamber, as set forth.

6. A valve mechanism of the class described comprising a valve-chamber, a series of steam-inlets leading into said chamber, valves for said inlets and a steam-outlet leading from the chamber at a point equidistant from the several inlets.

In testimony whereof I have signed my name to this specification in the presence of two subscribing witnesses.

THOMAS SIMPSON.

Witnesses:
J. C. LYONS,
W. V. EWELL.